United States Patent
Zhu et al.

(10) Patent No.: US 10,752,056 B2
(45) Date of Patent: Aug. 25, 2020

(54) TRUCK TIRE TREAD AND TRUCK TIRE

(71) Applicants: COMPAGNIE GENERALE DES ETABLISSEMENTS MICHELLIN, Clermont-ferrand (FR); MICHELIN RECHERCHE ET TECHNIQUE S.A., Granges-Paccot (CH); Fang Zhu, Greenville, SC (US); Terence Wallace, Greenville, SC (US)

(72) Inventors: Fang Zhu, Greer, SC (US); Terence Wallace, Fountain Inn, SC (US)

(73) Assignee: Compagnie Generale Des Etablissements Michellin, Clermont-Ferrand (FR)

( * ) Notice: Subject to any disclaimer, the term of this patent is extended or adjusted under 35 U.S.C. 154(b) by 253 days.

(21) Appl. No.: 15/577,217

(22) PCT Filed: May 25, 2016

(86) PCT No.: PCT/US2016/033989
§ 371 (c)(1),
(2) Date: Nov. 27, 2017

(87) PCT Pub. No.: WO2016/191443
PCT Pub. Date: Dec. 1, 2016

(65) Prior Publication Data
US 2018/0141386 A1   May 24, 2018

(51) Int. Cl.
  *B60C 11/03* (2006.01)
  *B60C 11/04* (2006.01)
(52) U.S. Cl.
  CPC ........ *B60C 11/0323* (2013.01); *B60C 11/033* (2013.01); *B60C 11/04* (2013.01); *B60C 2200/06* (2013.01)

(58) Field of Classification Search
  CPC ............................. B60C 11/0323; B60C 11/04
  (Continued)

(56) References Cited

U.S. PATENT DOCUMENTS

| D502,444 S | 3/2005 | Wage |
| D790,444 S | 6/2017 | Zhu |

(Continued)

FOREIGN PATENT DOCUMENTS

| AU | 584170 B2 * | 5/1989 | ......... B60C 11/0318 |
| JP | 03125606 A * | 5/1991 | ............. B60C 11/12 |

(Continued)

OTHER PUBLICATIONS

English Translation of JP-03125606-A; Saga, Mitsuo; "Heavy Load Radial Tire"; (1991) (Year: 1991).*

(Continued)

*Primary Examiner* — Robert C Dye
*Assistant Examiner* — Edgaredmanuel Troche
(74) *Attorney, Agent, or Firm* — Neal P. Pierotti

(57) ABSTRACT

A heavy truck tire tread is provided that has at least four longitudinal grooves, at least four longitudinal grooves comprising two open grooves and at least two partially hidden grooves. The longitudinal grooves defining two shoulder ribs, two intermediate ribs and at least one center rib, wherein the shape, size and position of the grooves are for any section of tread of any given section length L between 12 to 40 mm, the percentage difference in rubber mass of a rib section compared to a respective neighboring rib section of the same section length L in the same rib is less than a maximum percentage difference, wherein
  the maximum percentage difference for a shoulder rib is $Ds(\%)=50/L(mm)$,
  the maximum percentage difference for an intermediate rib is $Di(\%)=70/L(mm)$, and (Continued)

the maximum percentage difference for a full tread section is Da(%)=40/L(mm).

9 Claims, 4 Drawing Sheets

(58) Field of Classification Search
USPC .................................................. 152/209.18
See application file for complete search history.

(56) References Cited

U.S. PATENT DOCUMENTS

| | | | |
|---|---|---|---|
| 2011/0048603 A1* | 3/2011 | Kleffmann | B60C 11/04 152/209.21 |
| 2011/0168311 A1 | 7/2011 | Voss | |
| 2011/0277898 A1* | 11/2011 | Barraud | B60C 11/0306 152/209.18 |
| 2012/0227883 A1* | 9/2012 | Audigier | B60C 11/0309 152/209.18 |
| 2013/0061993 A1 | 3/2013 | Mathonet | |
| 2014/0290814 A1* | 10/2014 | Audigier | B60C 11/0306 152/209.17 |
| 2014/0299242 A1* | 10/2014 | Chauvin | B60C 11/032 152/209.8 |
| 2015/0273950 A1 | 10/2015 | Martin | |

FOREIGN PATENT DOCUMENTS

| | | | |
|---|---|---|---|
| JP | 2009035130 A | * | 2/2009 |
| JP | 2014509576 A | | 4/2014 |

OTHER PUBLICATIONS

AU-584170-B2; Kojima, Yoshihide; "A Tire Improved in Uniformity"; (1986) (Year: 1989).*

English Translation of JP-2009035130-A; Iwasaki, Naoaki; "Pneumatic Tire"; (2009) (Year: 2009).*

European Patent Office; International Search Report and Written Opinion for patent application PCT/US2015/032970; dated Jan. 22, 2016; Publisher: European Patent Office, Rijswijk, Netherlands, pp. 1-11 enclosed.

European Patent Office; International Search Report and Written Opinion for patent application PCT/US2016/033989; dated Sep. 19, 2016; Publisher: European Patent Office, Rijswijk, Netherlands, pp. 1-10 enclosed.

* cited by examiner

TRUCK TIRE TREAD AND TRUCK TIRE

BACKGROUND OF THE INVENTION

Field of the Invention

This invention relates generally to a tire tread. More specifically, this invention relates to tire treads for heavy trucks, in particular tires for free-rolling wheels thereof (so called steer positions and trailer positions), especially tires for steer positions.

Description of the Related Art

Tire treads generally extend about the outer circumference of a tire to operate as the intermediary between the tire and a surface upon which it travels (the operating surface). Contact between the tire tread and the operating surface occurs along a footprint of the tire. Tire treads provide grip to resist tire slip that may result during tire acceleration, braking, and/or cornering. Tire treads may also include tread elements, such as ribs or lugs, and tread features, such as grooves and sipes, each of which may assist in providing target tire performance when a tire is operating under particular conditions. The tread pattern generally includes repetitions of identical sub-patterns, the length of such sub-pattern being referred to as the "pitch". Each rib (seen in isolation) may have its own pitch and this pitch may be different from the pitch of the full tread including all tread elements and features.

One common problem faced by tire manufacturers is how to increase the wear resistance of treads and further reduce the rolling resistance of tires.

A solution is to increase the ratio of the tread surface being in contact with the operating surface. This ratio is known as the Contact Surface Ratio (CSR). Increasing the CSR is known to be beneficial for wear life and can be beneficial for rolling resistance too. However, increasing the CSR is also known for harming the wet braking adherence performance of the tread. Wet braking adherence performance being a very important element, this trade-off may not be acceptable.

Irregular wear is also a great concern as it can provoke vibrations that become sensible by the driver in the steering wheel or a poor looking wear pattern, both of which leading to the tire being often removed from service at an early stage of its wear life.

Therefore, to reduce the rolling resistance of tires it may be desirous to propose a novel way to design tire treads that would not result in compromising their wet braking performance or the wear life of the tread.

SUMMARY OF THE INVENTION

The invention provides for a heavy truck tire tread having a longitudinal direction, a lateral direction and a thickness direction, said tread having a ground-engaging contact surface and comprising at least four longitudinal grooves, the at least four longitudinal grooves comprising two open grooves and at least two partially hidden grooves, the partially hidden grooves comprising open portions and duct portions alternated along the longitudinal direction of the tread, said at least four longitudinal grooves defining two shoulder ribs, two intermediate ribs and at least one center rib, wherein the shape, size and position of the grooves are such that for any section of tread of any given section length L between 12 mm and 40 mm, the percentage difference in rubber mass of a rib section compared to a respective neighboring rib section of the same section length L in the same rib is less than a maximum percentage difference, wherein the maximum percentage difference for a shoulder rib is $Ds(\%)=50/L(mm)$ (eq. 1), the maximum percentage difference for an intermediate rib is $Di(\%)=70/L(mm)$ (eq. 2), and the maximum percentage difference for a full tread section is $Da(\%)=40/L(mm)$ (eq. 3).

Preferably, the maximum percentage difference for a center rib is $Dc(\%)=80/L(mm)$ (eq. 4).

More preferably, the shape, size and position of the grooves are such that:

the maximum percentage difference for a shoulder rib is $Ds(\%)=40/L(mm)$ (eq. 5), the maximum percentage difference for an intermediate rib is $Di(\%)=60/L(mm)$ (eq. 6), the maximum percentage difference for a full tread section is $Da(\%)=27/L(mm)$ (eq. 7), and the maximum percentage difference for a center rib is $Dc(\%)=71/L(mm)$ (eq. 8).

Preferably, the heavy truck tire tread has five longitudinal grooves wherein the two intermediate grooves are open grooves and the center groove and two shoulder grooves are partially hidden grooves. More preferably the open portions of the shoulder grooves are longitudinally offset with open portions of the center groove.

Preferably, the open grooves are undulating in the lateral direction of the tread.

The invention also provides for a heavy truck tire comprising such a tread.

The foregoing and other objects, features and advantages of the invention will be apparent from the following more detailed descriptions of a particular embodiment of the invention.

DETAILED DESCRIPTION OF A PARTICULAR EMBODIMENT

Figure 2:
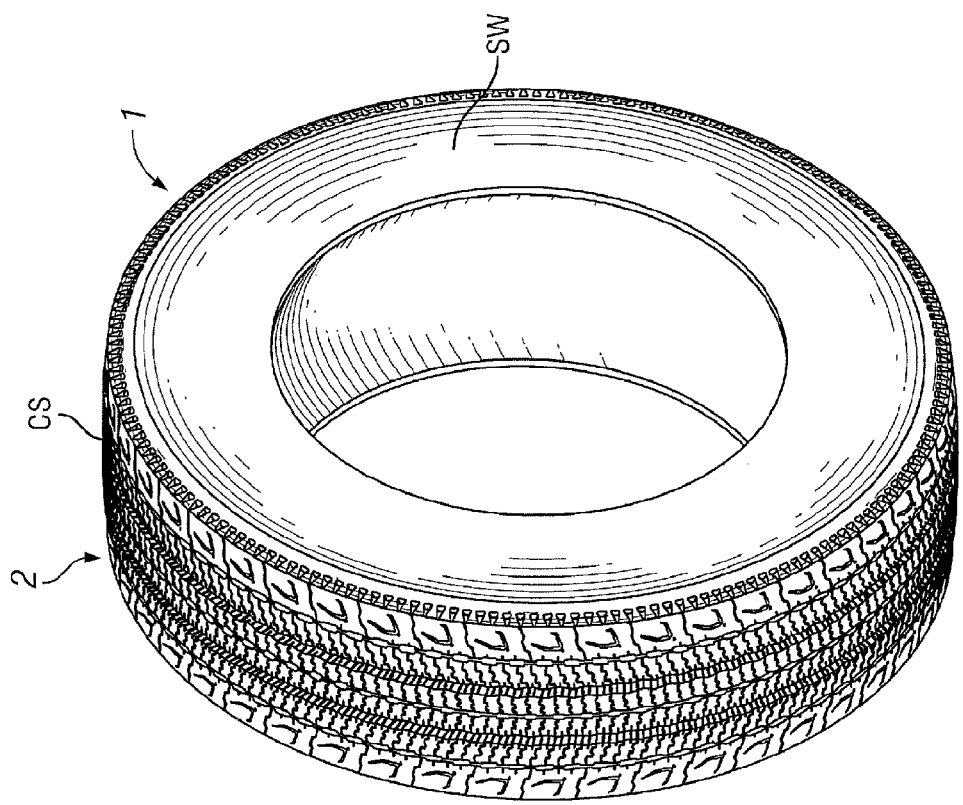
FIG. 2 is a perspective view of the heavy truck tire of FIG. 1.

Reference will now be made in detail to an embodiment of the invention, one example of which is illustrated in the drawings. This example is provided by way of explanation of the invention.

Figure 1:
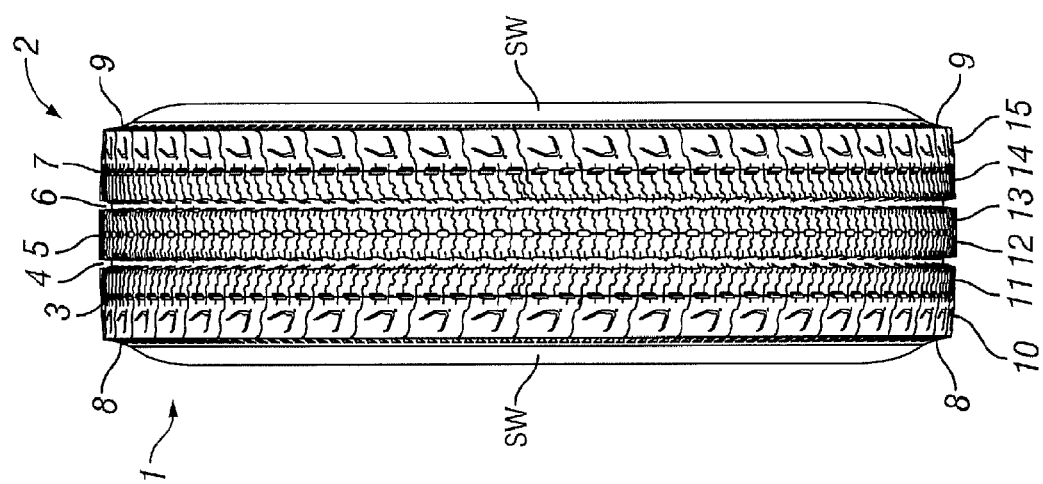
FIG. 1 is a front view of a heavy truck tire comprising an embodiment of the disclosed tire tread.

As shown in FIGS. 1 and 2, a heavy truck tire 1 comprises a tread 2 according to an embodiment of the invention. The tread 2 has five longitudinal grooves 3, 4, 5, 6 and 7 going continuously around the circumference of the tire. Between tread shoulders 8 and 9, the five longitudinal grooves define six ribs 10, 11, 12, 13, 14 and 15.

The grooves 3 and 7 closest to the tread shoulders will now be referred to as the "shoulder grooves". The groove 5 located in the tread center will now be referred to as the "center groove". The grooves 4 and 6 situated between the center and shoulder grooves will now be referred to as "intermediate grooves".

The ribs 10 and 15 between shoulders and shoulder grooves will now be referred to as the "shoulder ribs". The ribs 11 and 14 between shoulder grooves and intermediate grooves will now be referred to as the "intermediate ribs". The ribs 12 and 13 between intermediate grooves on both sides of the center groove will now be referred to as the "center ribs". In a tread having five ribs (and not six ribs as in the described embodiment), there would be only one center rib as there would be no center groove.

The tread has a contact surface CS for engaging the operating surface on which the tire is rolling and the tire 1 has sidewalls SW.

Figure 3:
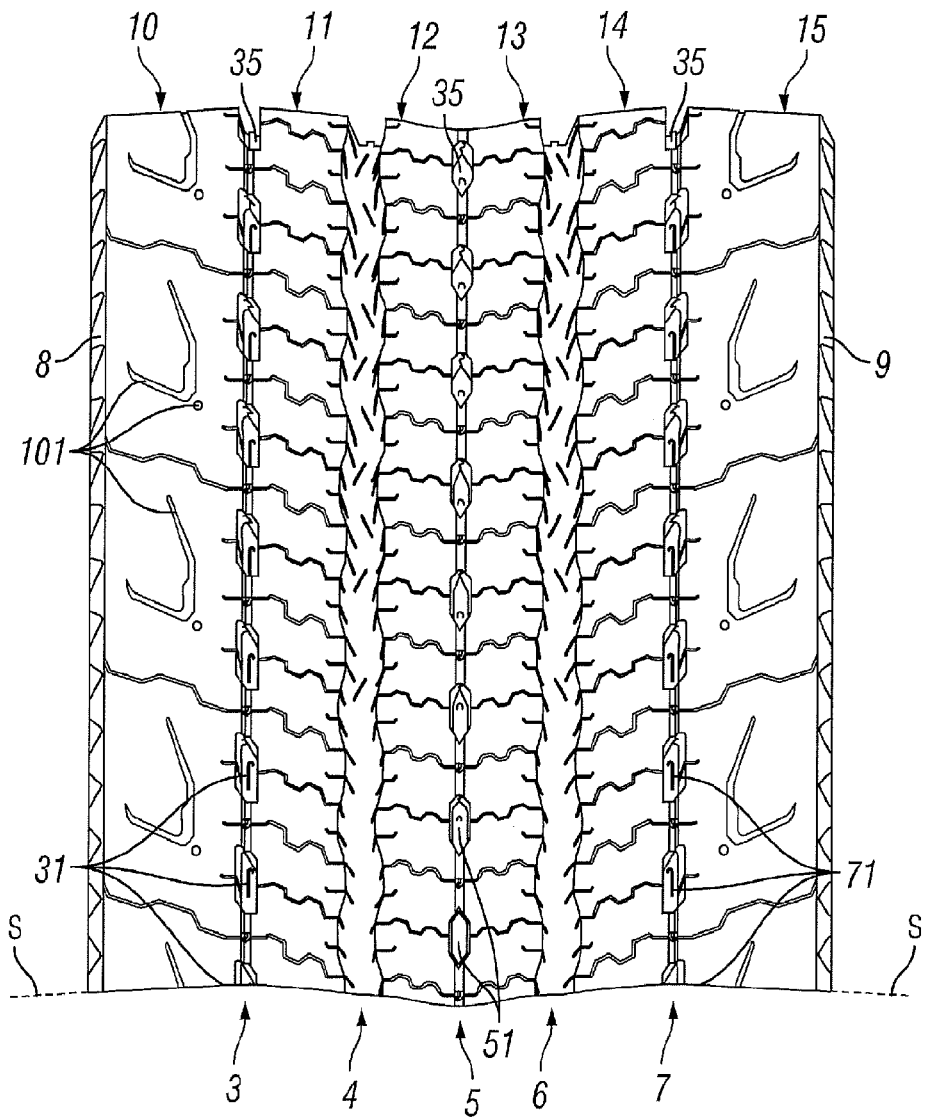
FIG. 3 is a front view of part of the tread of FIGS. 1 and 2 showing details of its design at a much bigger scale.

As better visible on FIG. 3 which is showing a portion of an embodiment of the disclosed tread 2 at a much bigger scale, the longitudinal grooves 3, 4, 5, 6 and 7 can be open grooves or partially hidden grooves. A partially hidden groove is a groove which is not fully visible because open portions alternate with portions where only a narrow cut is connecting a groove duct to the contact surface of the tread. Narrow cuts in tread are referred to as "sipes". Compared to an open groove, a partially hidden groove allows for a greater contact surface area but is still able to efficiently convey water out of the contact patch when the tire is rolling on a wet road.

According to the invention, the tread has two open grooves and at least two partially hidden grooves.

In an embodiment of the invention and as represented in the drawings, the two open grooves are the intermediate grooves 4 and 6 and there are three partially hidden grooves, those three partially hidden grooves being the center groove 5 and the two shoulder grooves 3 and 7.

In the respective partially hidden grooves 3, 5 and 7, open portions 31, 51 and 71 alternate with hidden ducts 32, 52 and 72. Sipes 33, 53 and 73 connect the respective ducts to the contact surface CS and can be of various shapes but may preferably be undulated as visible on FIG. 4 in order for both sides of the cut to interlock when the tread rubber is being compressed in the tire contact patch.

Figure 4:
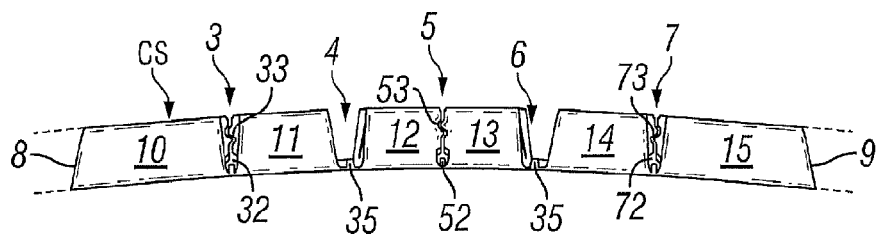
FIG. 4 is a section view of the tread taken along line S-S on FIG. 3 showing other details of its design.

As visible on FIG. 4, the bottom of the open grooves and the bottom of the open portions of the partially hidden grooves may be protected by stone ejectors 35.

In particular embodiments of the disclosed tread, despite the uneven nature of partially hidden grooves, the rubber mass distribution is kept even enough to obey specific design rules. Those rules will now be exposed in combination with FIGS. 5 and 6. These design rules dictate that the mass of a section of any tread rib is varying less than a given maximum percentage difference compared to any neighboring section of the same rib.

The design rules are observed for section length comprised between 12 and 40 mm and the maximum percentage difference is a function of the length of the section in consideration and is specific for each rib.

Figure 5:
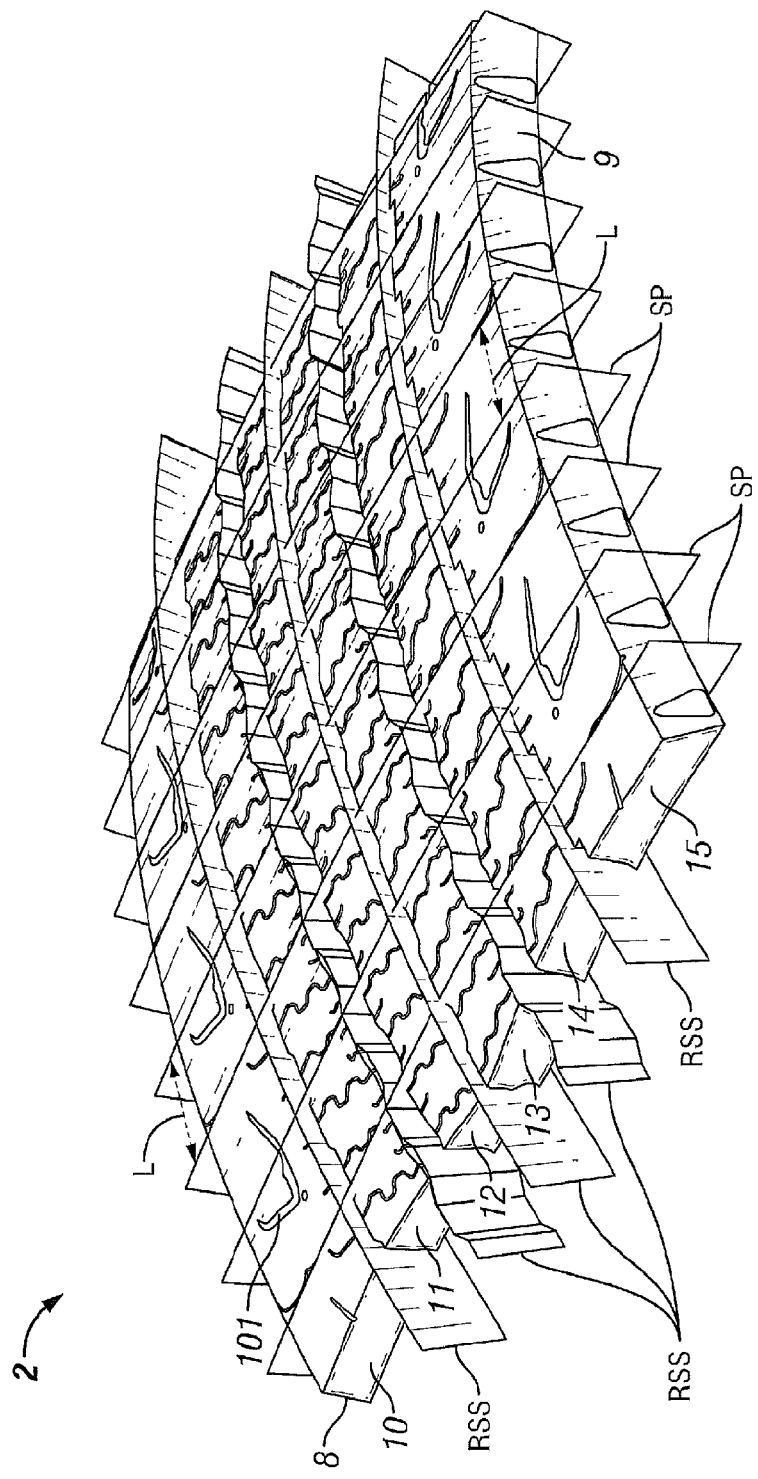
FIG. 5 is a perspective view of the tread part of FIG. 3 showing rib splitting surfaces and radial sections planes for mass measurements.
Figure 6:
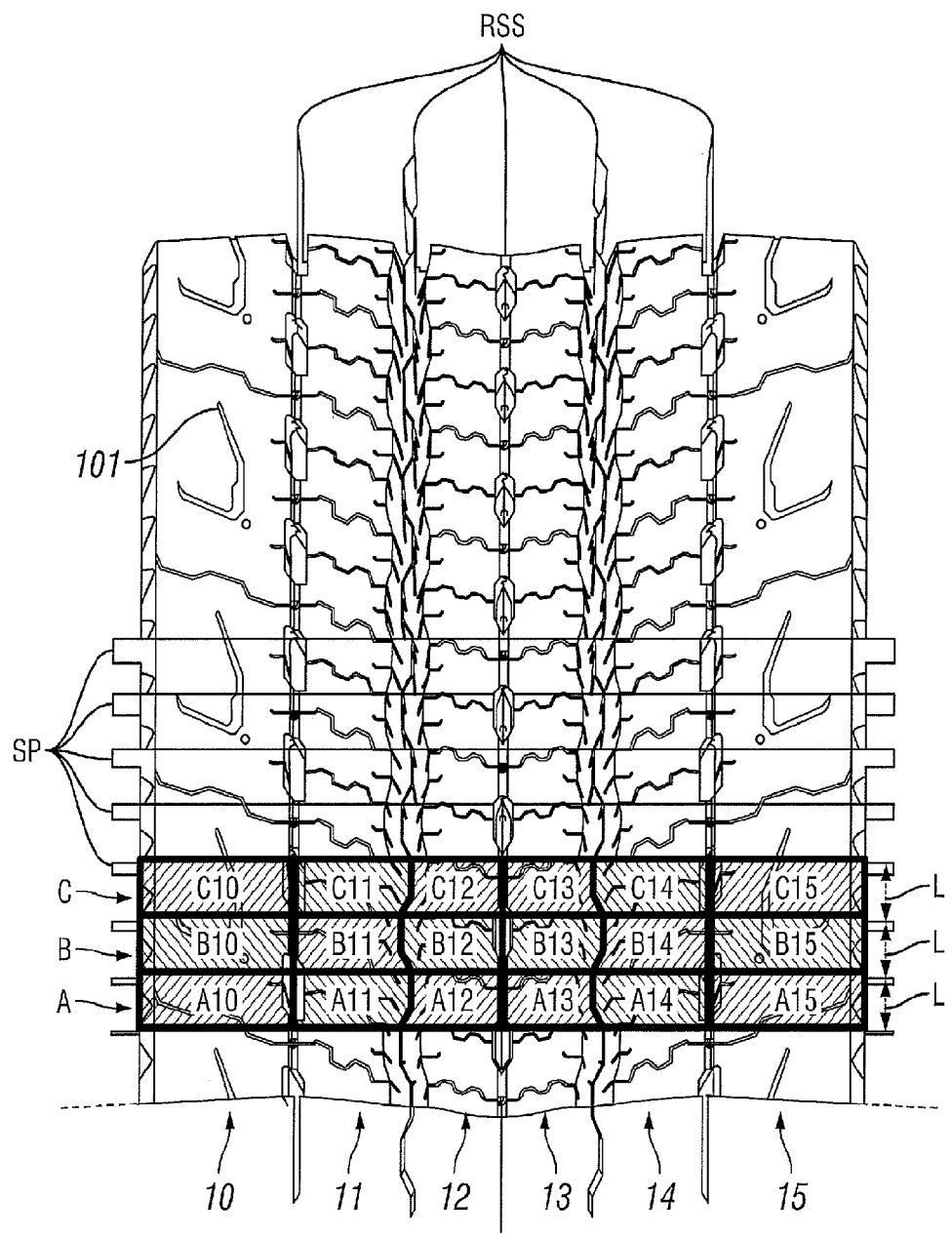
FIG. 6 is a front view similar to FIG. 3 showing rib splitting surfaces and radial sections planes for mass measurements as on FIG. 5.

FIGS. 5 and 6 shows rib splitting surfaces RSS representing the surfaces where the grooves split the tread ribs. Those surfaces thus run in the center of the groove bottoms. They can be straight if the grooves are straight and can undulate if the grooves are undulating.

FIG. 5 also shows radial sections planes SP separated by a given length L, the length L being measured along the contact surface and at the center of the tread. On the example of FIG. 5, the length L is 33 mm which corresponds here to the pitch of all tread ribs except for the shoulder ribs which have a pitch of 66 mm.

FIG. 6 is showing an example using a section length L of 16.5 mm corresponding to half the pitch of all tread ribs except for the shoulder ribs.

The principle of the design rules according to the invention is illustrated on FIG. 6. The tread is cut along radial sections planes SP into neighboring sections A, B, C and the ribs are separated along the rib splitting surfaces RSS. This defines respectively shoulder rib sections A10, B10, C10, A15, B15 and C15, intermediate rib sections A11, B11, C11, A14, B14 and C14 and center rib sections A12, B12, C12, A13, B13 and C13.

The profiled thickness of the tread is defined by a line which is translated from the contact surface profile to the bottom(s) of the groove(s) as illustrated on FIG. 4.

The design rules according to the invention dictate that the percentage difference in mass between any full tread section and a neighboring full tread section is less than a maximum section percentage difference which is given according to the length L of the section. For example, one would compare the mass of section B (that is the sum of the mass of all B rib sections) to the mass of section A (that is the sum of the mass of all A rib sections). The percentage difference could equally be computed between section B and C or between any other pair of neighboring sections.

The design rules according to the invention also dictate that the percentage difference between neighboring rib sections in the same rib is also less than a maximum rib percentage difference. This applies to shoulder and intermediate ribs and preferably to center ribs too.

For example, one would compare the mass of shoulder rib section B10 to the mass of shoulder rib section A10. The percentage difference could equally be computed between shoulder rib sections B15 and C15 or any other pair of neighboring shoulder rib sections.

The comparisons described above can be established by physically weighing each section of a tread after it has been cut according to the principles exposed above. But more conveniently, the comparisons described above can be made at the stage of designing the tread using CAD computer tools, by computing the rubber volumes of each tread section and of each rib in said tread section.

For example, the inventive design rule was checked by the applicants on the preferred tread design using their CAD computer tools. Volume comparisons were successively established for a 12 mm section length, a 16.5 mm section length (as described above with reference to FIG. 6) and a 40 mm section length.

The results are given in the tables below. The tables show the effective greatest percentage differences found for the Example tread design shown in the figures and those can be compared to the maximum percentage differences calculated according to the design rules for each of the respective section length L. For instance, for L=12 mm, the maximum percentage difference for the intermediate rib according to the formula of Equation 2 is $Di(\%)=70/L=70/12=5.83\%$. According to the formula of Equation 6, the maximum percentage difference for the intermediate rib is preferably $Di(\%)=60/L=60/12=5.00\%$. The computed maximum intermediate percentage difference in the Example tread design being 3.45%, this verifies both design rules.

| L = 12 mm | | | |
|---|---|---|---|
| Max % Diff | Example | Equations 1-4 | Equations 5-8 |
| Shoulder (Ds) | 3.32% | 4.17% | 3.33% |
| Intermediate (Di) | 3.45% | 5.83% | 5.00% |
| Full tread (Da) | 1.97% | 3.33% | 2.25% |
| Center (Dc) | 5.84% | 6.67% | 5.92% |

| L = 16.5 mm | | | |
|---|---|---|---|
| Max % Diff | Example | Equations 1-4 | Equations 5-8 |
| Shoulder (Ds) | 1.98% | 3.03% | 2.42% |
| Intermediate (Di) | 1.06% | 4.24% | 3.64% |
| Full tread (Da) | 1.63% | 2.42% | 1.64% |
| Center (Dc) | 3.52% | 4.85% | 4.30% |

| L = 40 mm | | | |
|---|---|---|---|
| Max % Diff | Example | Equations 1-4 | Equations 5-8 |
| Shoulder (Ds) | 0.55% | 1.25% | 1.00% |
| Intermediate (Di) | 1.00% | 1.75% | 1.50% |
| Full tread (Da) | 0.31% | 1.00% | 0.68% |
| Center (Dc) | 0.83% | 2.00% | 1.78% |

In order for the tread design to obey the design rules of the invention, the skilled person in the art of designing treads can recourse to many different options that can be applied alternatively or cumulatively to balance the mass between sections despite the presence of partially hidden grooves.

The figures already illustrate design solutions according to a preferred embodiment of the invention.

For example, the two open grooves 4 and 6 undulate in the lateral direction of the tread to affect the rubber mass repartition between intermediate and center ribs and compensate for the mass deficits created by the open portions in the shoulder and center grooves. Preferably then, the open portions 31 and 71 in the shoulders grooves are longitudinally offset relative to the open portions 51 in the center groove.

Depressions that can be more or less shallow at the surface of the tread can also be used to reduce the mass of some rib sections. This is illustrated here on the shoulder ribs where such shallow depressions 101 were used to reduce the mass of the shoulder rib sections facing the hidden portions of the shoulder grooves.

Sipes of varying depth, width and density can also be used for spreading the mass as evenly as possible to obey the design rules.

Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A heavy truck tire tread having a longitudinal direction, a lateral direction and a thickness direction, said tread having a ground-engaging contact surface and comprising at least four longitudinal grooves, the at least four longitudinal grooves comprising two open grooves and at least two partially hidden grooves, the partially hidden grooves comprising partially hidden groove open portions and duct portions alternated along the longitudinal direction of the tread wherein sipes extend from the duct portions to the contact surface and extend from one of the partially hidden groove open portions to a successive one of the partially hidden groove open portions, wherein the duct portions open into the open portions such that the open portions extend in the thickness direction to a depth that is the same as bottoms of the duct portions in the thickness direction, said at least four longitudinal grooves defining two shoulder ribs, two intermediate ribs and at least one center rib, wherein a length L extends in the longitudinal direction and is selected to be between 12 mm and 40 mm, wherein the two shoulder ribs each define a plurality of shoulder rib sections each having the same length L, wherein the two intermediate ribs each define a plurality of intermediate rib sections each having the same length L, wherein the at least one center rib defining a plurality of center rib sections each having the same length L, wherein the length Ls for the plurality of shoulder rib sections, the plurality of intermediate rib sections, and the plurality of center rib sections are all the same length, and wherein the two shoulder ribs, the two intermediate ribs, and the at least one center rib define a plurality of full tread sections each having the same length L and each extending across a width of the tread in the lateral direction, wherein the length Ls for the plurality of full tread sections are the same length as the length Ls for the plurality of shoulder rib sections, the plurality of intermediate rib sections, and the plurality of center rib sections, wherein the shape, size and position of the grooves are such that:

a percentage difference in rubber mass greater than zero of each of the shoulder rib sections as compared to an immediately adjacent one of the shoulder rib sections successive in the longitudinal direction in the same shoulder rib is less than a maximum percentage difference in rubber mass for a shoulder rib, a percentage difference in rubber mass greater than zero of each of the intermediate rib sections as compared to an immediately adjacent one of the intermediate rib sections successive in the longitudinal direction in the same intermediate rib is less than a maximum percentage difference in rubber mass for an intermediate rib, a percentage difference in rubber mass greater than zero of each one of the center rib sections as compared to an immediately adjacent one of the center rib sections successive in the longitudinal direction in the same center rib is less than a maximum percentage difference in rubber mass for a center rib, a percentage difference in rubber mass greater than zero of each one of the full tread sections as compared to an immediately adjacent one of the full tread sections successive in the longitudinal direction is less than a maximum percentage difference in rubber mass for a full tread section, wherein the maximum percentage difference in rubber mass for a shoulder rib is $Ds(\%) = 50/L(mm)$, the maximum percentage difference in rubber mass for an intermediate rib is Di(%)=70/L(mm), and the maximum percentage difference in rubber mass for a full tread section is Da(%)=40/L(mm).

2. A heavy truck tire tread according to claim 1 wherein the maximum percentage difference in rubber mass for a center rib is Dc(%)=80/L(mm).

3. A heavy truck tire tread according to claim 1 wherein the maximum percentage difference in rubber mass for a shoulder rib is Ds(%)=40/L(mm), the maximum percentage difference in rubber mass for an intermediate rib is Di(%)=60/L(mm), and the maximum percentage difference in rubber mass for a full tread section is Da(%)=27/L(mm).

4. A heavy truck tire tread according to claim 1 wherein the maximum percentage difference in rubber mass for a center rib is Dc(%)=71/L(mm).

5. A heavy truck tire tread according to claim 1 having five longitudinal grooves wherein the two intermediate grooves are open grooves and the center groove and two shoulder grooves are partially hidden grooves.

6. A heavy truck tire tread according to claim 5 wherein shoulder groove open portions are longitudinally offset with center groove open portions.

7. A heavy truck tire tread according to claim 1 wherein the open grooves are undulating in the lateral direction of the tread.

8. A heavy truck tire comprising a tread according to claim 1.

9. A heavy truck tire tread having a longitudinal direction, a lateral direction and a thickness direction, said tread having a ground-engaging contact surface and comprising at least four longitudinal grooves, the at least four longitudinal grooves comprising two open grooves and at least two partially hidden grooves, the partially hidden grooves comprising partially hidden groove open portions and duct portions alternated along the longitudinal direction of the tread wherein sipes extend from the duct portions to the contact surface and extend from one of the partially hidden groove open portions to a successive one of the partially hidden groove open portions, wherein the duct portions open into the open portions such that the open portions extend in the thickness direction to a depth that is the same as bottoms of the duct portions in the thickness direction, said at least four longitudinal grooves defining two shoulder ribs, two intermediate ribs and at least one center rib, wherein the intermediate rib has an intermediate rib sipe that extends from one of the open portions of one of the partially hidden grooves to one of the open grooves, wherein one of the shoulder ribs has a depression on a surface of the shoulder rib that extends in the thickness direction into the tread a distance less than extension of one of the partially hidden grooves in the thickness direction into the tread, wherein the depression and one of the duct portions of the one of the partially hidden grooves are at a same location in the longitudinal direction, wherein a length L extends in the longitudinal direction and is selected to be between 12 mm and 40 mm, wherein the two shoulder ribs each define a plurality of shoulder rib sections each having the same length L, wherein the two intermediate ribs each define a plurality of intermediate rib sections each having the same length L, wherein the at least one center rib defining a plurality of center rib sections each having the same length L, wherein the length Ls for the plurality of shoulder rib sections, the plurality of intermediate rib sections, and the plurality of center rib sections are all the same length, and wherein the two shoulder ribs, the two intermediate ribs, and the at least one center rib define a plurality of full tread sections each having the same length L and each extending across a width of the tread in the lateral direction, wherein the length Ls for the plurality of full tread sections are the same length as the length Ls for the plurality of shoulder rib sections, the plurality of intermediate rib sections, and the plurality of center rib sections, wherein a shoulder rib pitch of one of the shoulder ribs is different than an intermediate rib pitch of one of the intermediate ribs and is different than a center rib pitch of one of the center ribs, wherein the shape, size and position of the grooves are such that:

a percentage difference in rubber mass greater than zero of each of the shoulder rib sections as compared to an immediately adjacent one of the shoulder rib sections successive in the longitudinal direction in the same shoulder rib is less than a maximum percentage difference in rubber mass for a shoulder rib, a percentage difference in rubber mass greater than zero of each of the intermediate rib sections as compared to an immediately adjacent one of the intermediate rib sections successive in the longitudinal direction in the same intermediate rib is less than a maximum percentage difference in rubber mass for an intermediate rib, a percentage difference in rubber mass greater than zero of each one of the center rib sections as compared to an immediately adjacent one of the center rib sections successive in the longitudinal direction in the same center rib is less than a maximum percentage difference in rubber mass for a center rib, a percentage difference in rubber mass greater than zero of each one of the full tread sections as compared to an immediately adjacent one of the full tread sections successive in the longitudinal direction is less than a maximum percentage difference in rubber mass for a full tread section, wherein the maximum percentage difference in rubber mass for a shoulder rib is Ds(%)=40/L(mm), the maximum percentage difference in rubber mass for an intermediate rib is Di(%)=60/L(mm), the maximum percentage difference in rubber mass for a center rib is Dc(%)=71/L(mm), and the maximum percentage difference in rubber mass for a full tread section is Da(%)=27/L(mm).

* * * * *